United States Patent
Stahl et al.

(10) Patent No.: US 7,976,040 B2
(45) Date of Patent: Jul. 12, 2011

(54) AXLE AIR DUMP FOR MULTIPLE AXLE VEHICLES

(75) Inventors: Ron R. Stahl, Medina, OH (US); Charles E. Eberling, Wellington, OH (US); John G. Nosse, Grafton, OH (US); John V. Ripley, Elyria, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 12/759,949

(22) Filed: Apr. 14, 2010

(65) Prior Publication Data

US 2010/0201085 A1 Aug. 12, 2010

Related U.S. Application Data

(62) Division of application No. 11/859,568, filed on Sep. 21, 2007.

(51) Int. Cl.
*B60G 11/27* (2006.01)
(52) U.S. Cl. ............. 280/124.16; 280/124.157; 280/5.5; 280/5.514; 280/6.157
(58) Field of Classification Search .............. 280/5.5, 280/5.514, 86.5, 683, 6.157, 124.157, 124.16; 180/209
See application file for complete search history.

(56) References Cited

U.S. PATENT DOCUMENTS

| | | | | |
|---|---|---|---|---|
| 4,705,295 A * | 11/1987 | Fought | ............................ | 280/754 |
| 4,854,409 A * | 8/1989 | Hillebrand et al. | ......... | 180/24.02 |
| 4,903,209 A * | 2/1990 | Kaneko | ............................ | 701/37 |
| 5,052,713 A * | 10/1991 | Corey et al. | ..................... | 280/5.5 |
| 5,732,787 A * | 3/1998 | Hirahara et al. | ............ | 180/24.02 |
| 5,845,723 A * | 12/1998 | Hirahara et al. | ............ | 180/24.02 |
| 6,240,339 B1 * | 5/2001 | von Mayenburg et al. | ........ | 701/1 |
| 6,572,124 B2 * | 6/2003 | Mlsna et al. | .................. | 280/86.5 |
| 6,845,989 B2 * | 1/2005 | Fulton et al. | ............... | 280/6.157 |
| 7,133,759 B2 | 11/2006 | Fry | | |
| 7,222,867 B2 * | 5/2007 | Rotz et al. | ..................... | 280/86.5 |
| 2006/0091635 A1 | 5/2006 | Cook | | |
| 2006/0170168 A1 | 8/2006 | Rotz et al. | | |
| 2007/0080514 A1 * | 4/2007 | Stender et al. | .......... | 280/124.157 |

OTHER PUBLICATIONS

Bendix Service Data Brochure, SD-03-1063, "Bendix R-12P Pilot Relay Valve", Bendix Commercial Vehicle Systems LLC, 2004, pp. 1-8.

(Continued)

*Primary Examiner* — Ruth Ilan
*Assistant Examiner* — Timothy D Wilhelm
(74) *Attorney, Agent, or Firm* — Fay Sharpe LLP (57) ABSTRACT

A system and process for controlling vehicle loading on a multi-axle vehicle and improving maneuverability is disclosed. The system includes a reservoir of pressurized air and associated leveling valve that uses a relay valve to improve refill times when the vehicle returns from a dump mode operation to normal operation. The process reduces pressure in one or more of the axles when maneuvering the vehicle at predetermined slow speeds and maintaining that first predetermined pressure while the other axle(s) is at a greater pressure than the first axle. By preventing complete exhaustion of pressure from the suspension system, restoring air pressure is attained more quickly. Also, use of a relay valve enables higher flow rates to improve the refill time of the pneumatic suspension system after the dump operation.

19 Claims, 8 Drawing Sheets

OTHER PUBLICATIONS

Bendix Service Data Brochure, SD-03-3515, "Bendix RV-Pressure Reducing Valve", Bendix Commercial Vehicle Systems, LLC, 2004, pp. 1-6.

Bendix Service Data Brochure, SD-03-950, "Bendix LQ-2 Limiting and Quick Release Valve and TW-1 Control Valve", Bendix Commercial Vehicle Systems, LLC, 2004, pp. 1-4.

Bendix Service Data Brochure, SD-03-4650, "Bendix TR-2, TR-3 & TR-4 Inversion Valves", Bendix Commercial Vehicle Systems, LLC, 2004, pp. 1-4.

PCT/US2008/76979 International Search Report and Written Opinion, mailed Nov. 28, 2008.

* cited by examiner

AXLE AIR DUMP FOR MULTIPLE AXLE VEHICLES

This application is a divisional application of copending U.S. application Ser. No. 11/859,568, filed Sep. 21, 2007.

BACKGROUND OF THE INVENTION

This disclosure relates to a suspension system for a multi-axle vehicle, and more particularly to providing a system, method, and control logic for implementing air suspension control for at least one axle on a trailer. More particularly, the disclosure is directed to a method that alters the axle air suspension pressure partially exhausting or removing air from air suspension bags to reduce tire wear when maneuvering at low speeds. The disclosure precludes a driver of the vehicle from reducing air pressure from the axle suspension above a predetermined speed, and thereby prevents overloaded conditions.

Federal regulation, namely Title 49 of the Code of Federal Regulations, Section 393.207, states that "the air suspension exhaust controls must not have the capability to exhaust air from the suspension system of one axle of a two-axle air suspension trailer unless the controls are either located on the trailer, or the power unit and trailer combination are not capable of traveling at a speed greater than ten miles per hour while the air is exhausted from the suspension system."

One proposed solution is outlined in U.S. Pat. No. 5,052,713, the disclosure of which is incorporated herein by reference. The '713 patent is directed to a vehicle suspension system such as used in multi-axle tractor-trailers and other multi-axle vehicles. When maneuvering a trailer in a confined area such as a loading dock, torque is exerted on the trailer frame. One solution to the torque issue is to remove the load from all but one axle. The '713 patent teaches that air should be exhausted from the air bags on all but one axle in order to improve maneuverability at low speeds or during tight turns. Moreover, and per the federal regulation, the load must be redistributed to the multiple axles once the tight turn maneuvering is complete. Otherwise, the potential exists that a single axle may be overloaded, since the load has not been shifted to multiple axles. The overloading could result in potential damage to the trailer frame or dynamic loading encountered by the vehicle.

Although the '713 patent provides one solution, there are some downsides to this methodology and system. First, there is risk of damage to the air bags when all air is exhausted therefrom. The air bags may be pinched.

It is also important to note that the trailer will always be pivoting off the front axle, whether loaded or unloaded. It becomes important, therefore, that the system maintains the front axle with more pressure than the rear axle. That is, it is not just a question of unloading the rear axle, but assuring that the front axle has greater pressure than the rear axle.

There is also an issue of tire chattering that occurs when all of the pneumatic pressure is exhausted from one axle of the suspension system. Thus, there is a desire to prevent full exhaustion of the air suspension so that the tires associated with the axle are pushed to the ground.

Still another consideration relates to refilling the air bag. As will be appreciated, once maneuvering at low speeds is complete it becomes important to quickly re-distribute the load over the multiple axles. Known arrangements take as long as thirty (30) to forty (40) seconds to refill the exhausted air suspension. Unfortunately, in that time frame, the vehicle can be up to speed and the load has not been adequately re-distributed.

Yet another issue is that the air that supplies this system is obtained from the same reservoirs that are associated with the brake system.

There is also a potential advantage of using existing systems and components.

Thus, a need exists for an improved system that adds additional benefits in an economical, efficient manner.

SUMMARY OF THE INVENTION

An improved system and process for controlling vehicle loading on a multi-axle vehicle is provided.

The process for controlling the vehicle includes reducing pressure in a first axle suspension system when maneuvering the vehicle at predetermined slow speeds. Pressure is kept in the first axle pneumatic suspension system at the predetermined slow speed, and likewise a different pressure is kept in a second axle pneumatic suspension system at the predetermined slow speed. In one embodiment, keeping the pressure includes maintaining a first predetermined pressure at the slow speed, and a second predetermined pressure is maintained in a second axle of the pneumatic suspension system.

In a preferred arrangement, the second predetermined pressure is greater than the first predetermined pressure, and more preferably, the first predetermined pressure is on the order of 10 psi.

A pressure reducing step is dependent on the vehicle speed being ten miles per hour or less, and the process includes restoring air pressure upon vehicle speed exceeding the predetermined value.

The process advantageously uses an anti-lock brake system controller that is modified to include these control functions.

The air pressure restoring step uses a valve, such as a relay valve, to enable high flow rates to refill the pneumatic suspension system.

The system includes a reservoir of pressurized air, a leveling valve receiving pressurized air from the reservoir, a valve selectively delivering air to the air suspension assembly, and a controller monitors speed of the vehicle and permits air to be selectively reduced to a predetermined pressure once a predetermined speed is reached.

A primary benefit of the invention is the improved maneuverability of the vehicle at low speeds.

Another benefit relates to less torque being imposed on the frame, as well as reduced wear on the tires.

Still another benefit resides in less pinching of the air bags and the desired need to allow the air bags to keep their shape.

Yet another benefit relates to the improved re-inflation or quicker restoration of air pressure in the suspension system.

A further benefit is associated with conserving air in the overall system.

A still further benefit resides in the ability to integrate the process and system with an existing ABS system and controller.

Still other benefits and advantages of the disclosure will become apparent to those skilled in the art upon reading and understanding the following detailed description.

DETAILED DESCRIPTION OF THE PREFERRED EMBODIMENTS

Figure 1:
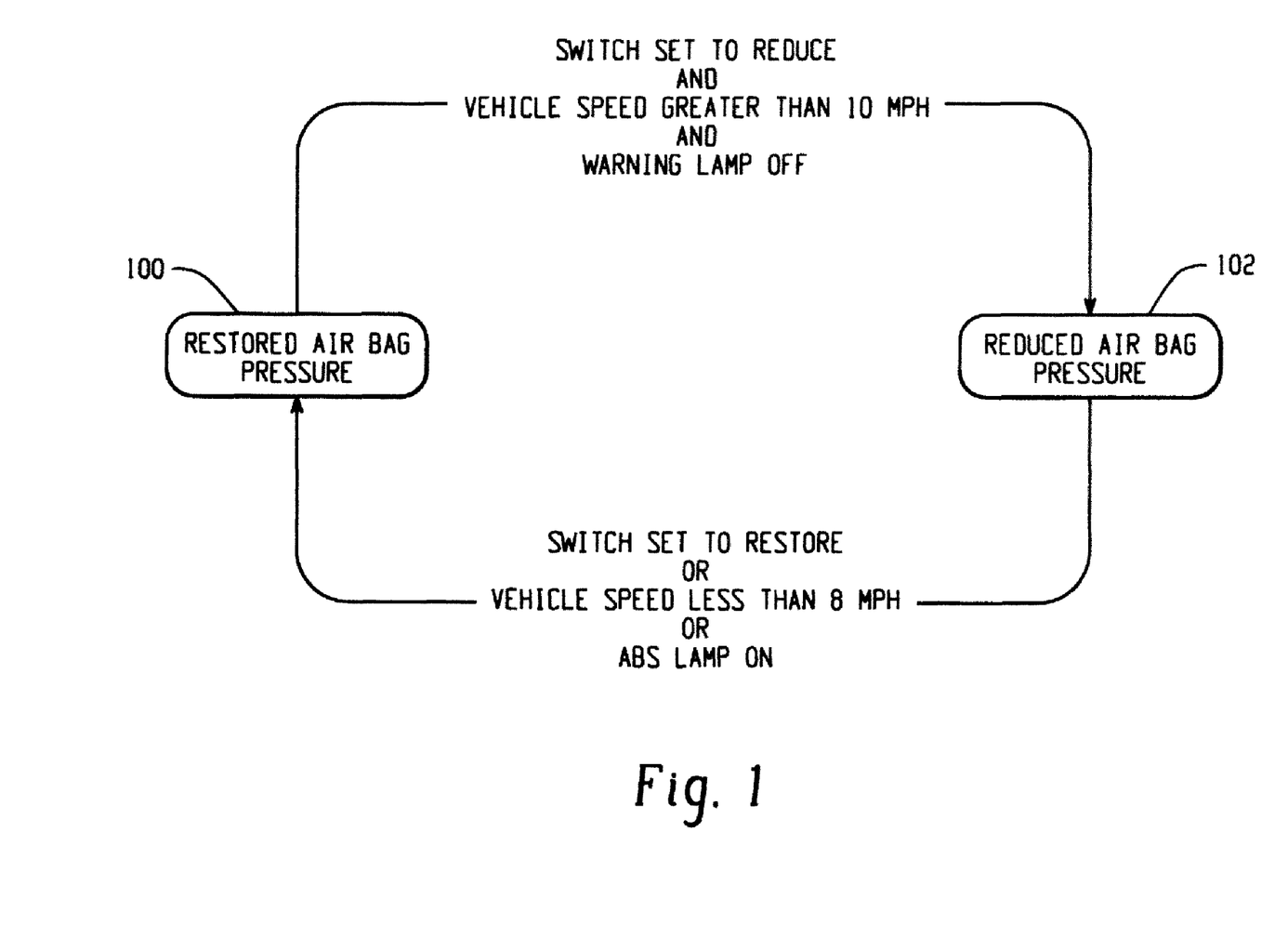
FIG. 1 is a schematic of the preferred logic associated with the present disclosure.

Turning first to FIG. 1, a trailer suspension dump valve (TSDV) is referenced for a semi-trailer (not shown) equipped with axle air suspensions in which air can be partially exhausted from air bags to reduce tire wear and improve vehicle maneuvering at slow speeds. This disclosure prevents the driver of the vehicle from removing air from the suspension of an axle above a predetermined speed, e.g., ten (10) miles per hour, using modified software incorporated into a conventionally available ABS brake controller. The system and method also reduce air bag pressure while preventing exhaustion of all air to atmosphere. The disclosure also advantageously improves the fill rate of the air bags once the slow speed maneuvering is completed and the vehicle then exceeds the predetermined speed.

Thus, as schematically illustrated, either original or restored air bag pressure is provided in the suspension system as noted by reference numeral 100. The operator actuates a switch, for example on the dashboard of the vehicle, the vehicle speed is monitored through a signal provided to an electronic control unit (ECU) of the vehicle, and the same information is input to the trailer antilock brake system (ABS or TABS) controller as typically found on a vehicle. In addition, a warning lamp may be provided to indicate whether or not the switch for activating the trailer suspension dump has been actuated. Thus, with the switch either activated to reduce air pressure in the rear axle air bags, or alternatively switched to a position set to restore air bag pressure, it is evident that the switch must be set to a desired position, and the speed of the vehicle monitored. The modified software incorporated into an existing ABS controller then indicates if the vehicle speed is greater than ten (10) miles per hour, whereby air must be automatically restored to the rear axle air bags. Only when the vehicle speed reaches some predetermined threshold, e.g., less than eight (8) to ten (10) miles per hour, will the software permit air bag pressure to be reduced. Thus, wheel speed is already provided to the ABS controller and can interact with the modified software to achieve these functions.

Figure 2:
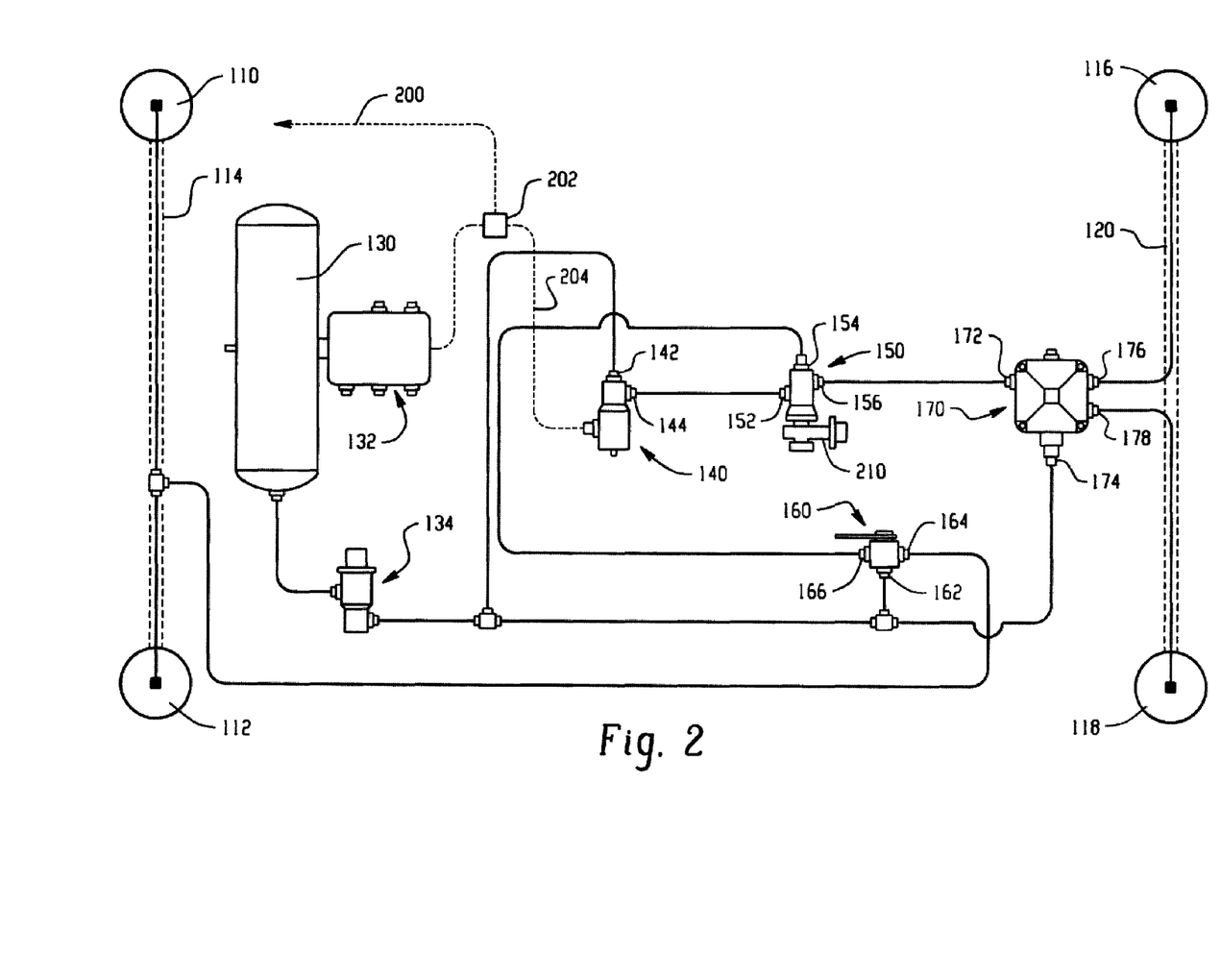
FIG. 2 is a schematic of a first preferred embodiment of the present disclosure.

FIG. 2 shows a first preferred arrangement, in which front air bags 110, 112 are associated with a first or front axle 114. Similarly, the suspension system includes air bags 116, 118 are associated with a second or rear axle 120. Pressurized air is provided from reservoir 130 which is maintained at a desired pressure by a compressor (not shown), as is well known in the art. All of the details of a conventional trailer antilock brake system (TABS) are not shown in order to reduce complexity, simplify the drawings, and for purposes of brevity. However, TABS controller 132 is represented as being in communication with the air reservoir 130 to provide rapid pulsed or controlled brake application in an anti-lock braking event, again, as is well known in the industry. As will also be appreciated, suitable signals are provided from the wheels to the controller 132 so that vehicle speed can be monitored.

The air suspension system, and particularly, the individual air bags 110, 112, 116, 118 of the multiple axles are supplied with pressurized air from the reservoir 130. That is, a pressure protection valve 134 is located downstream of the reservoir and protects system air pressure and maintains a constant specified pre-set pressure below that of the reservoir 130 if a downstream failure in the suspension system occurs. The pressure protection valve 134 would then prevent system pressure loss for the remaining pneumatic systems of the vehicle. The reduced pressure air is directly supplied to a pressure limiting valve assembly which includes a normally closed, three-way solenoid valve 140, and particularly a supply or inlet port 142 thereof. Delivery port 144 of the solenoid valve provides a control signal to an inversion valve 150, and particularly control port 152 thereof. Supply pressure from the protection valve 134 is also provided to a leveling valve 160, and specifically to the supply port 162 of the inversion valve. There are two delivery ports on the leveling valve. The first delivery port 164 supplying pressure to the air bags 110, 112 associated with the front axle. The second delivery port 166 communicates with a supply port 154 of the inversion valve 150 so that when a control signal is provided by the solenoid valve, pressure continues downstream to delivery port 156 that communicates with relay valve 170. More particularly, the delivered pressure from the inversion valve 150 communicates with a control port 172 of the relay valve so that supply port 174, that receives pressurized air from the pressure protection valve 134, is selectively delivered to first and second delivery ports 176, 178 and thus delivers pressurized air to the air bags 116, 118 associated with the rear axle.

Line 200 is representative of a signal received from a switch mounted on a dash of a vehicle cab. Line 200 communicates with a relay 202 which is also adapted to receive a signal from the TABS controller 132 indicative of a predetermined speed. When the TABS controller sees a velocity of less than ten (10) miles per hour, for example, and where a signal is received through line 200, then an appropriate signal is sent along line 204 that communicates with the solenoid valve 140. The solenoid is then energized and allows the solenoid valve to deliver air from port 144 to a control port 152 of the inversion valve and thereby cause the inversion valve to exhaust its delivery through a pressure protection valve 210 associated with the inversion valve. The pressure protection valve 210 is designed to only partially exhaust the pressurized air, i.e., so that the air suspension reaches a predetermined level, for example 10 psi, and causes relay valve 170 to exhaust the suspension associated with the rear axle to this same level. Thus, the pressure protection valve does not allow the suspension associated with the rear axle to fully or substantially exhaust and instead keeps pressure in the rear suspension system. When the signal through line 204 is removed, such as if the dash switch is de-actuated, or if the velocity goes above the predetermined speed (e.g. ten (10) miles per hour), the system then reverts back to a non-dump operation.

In the non-dump operation, leveling valve 160 delivers air to the supply port of the inversion valve. Since line 204 is not actuated, and thus the solenoid is not energized, control port 152 does not receive air pressure from the solenoid valve and thus the inversion valve delivers air to the control port of the relay valve 170, which, in turn, causes the relay valve to deliver air pressure to the suspension air bags 116, 118.

Figure 3:
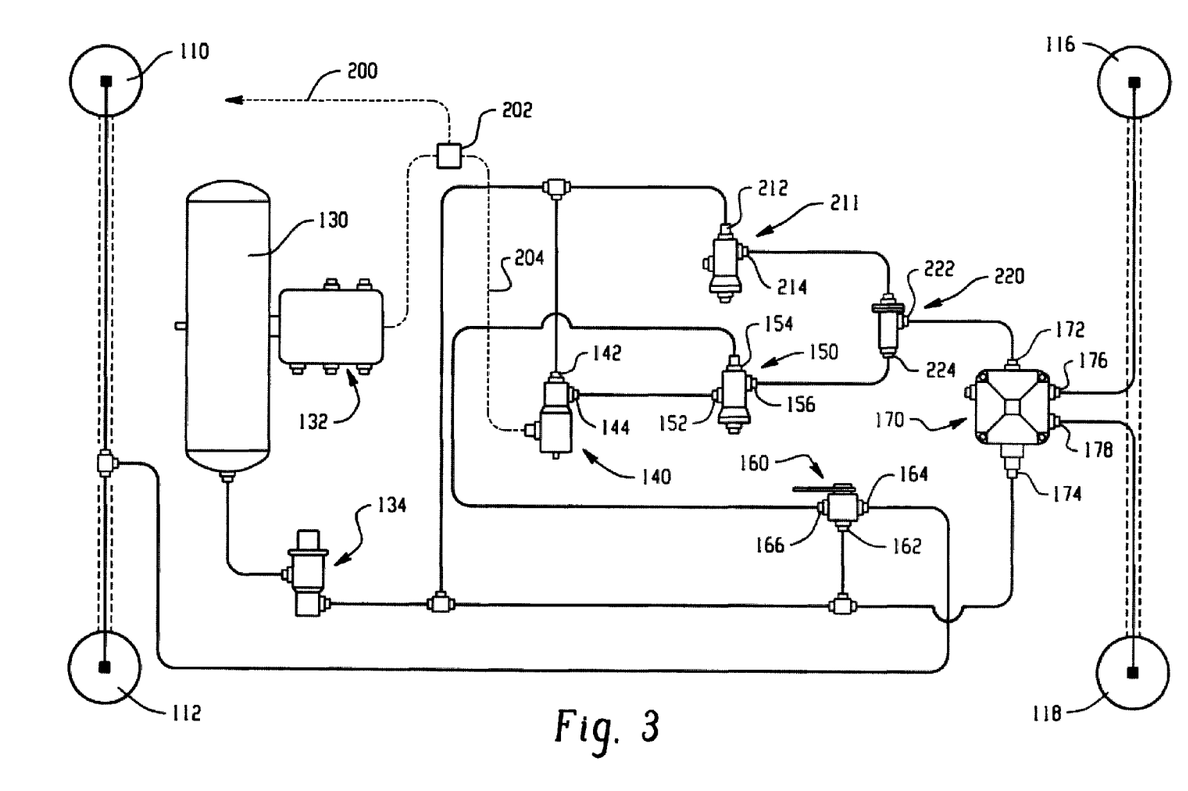
FIG. 3 is a schematic representation of a second preferred embodiment.

A second preferred embodiment is shown in FIG. 3 and for consistency and ease of illustration, like components will be identified by like reference numerals, while new components are identified by new reference numerals. In this arrangement, the solenoid valve 140 still communicates with the pressure protection valve 134 via supply port 142. As in the first embodiment, the leveling valve 160 still supplies the inversion valve 150 and particularly at the supply port 154 thereof. Here, however, a pressure reducing valve 211 (not a pressure protection valve as in FIG. 2) also receives pressure from the protection valve 134 at port 212. During a non-dump operation, the pressure from protection valve 134 proceeds through the reducing valve 211 to its outlet port 214, where it communicates with one side of a double-check valve 220, and namely port 222. However, higher pressure provided from the inversion valve 150, and namely from port 156 during a non-dump operation, communicates with port 224 of the two-way valve. The double-check valve 220, thus delivers the higher pressure from the inversion valve to the control port of relay valve 170. This causes the relay valve to deliver air to the air bags 116, 118 of the suspension associated with the second axle. Thus, the leveling valve 160 delivers air to the supply port of the inversion valve 150. Since there is no delivery from the solenoid valve 140, since no signal is present on line 204, the inversion valve 150 delivers air to the double-check valve. This port 224 of the double-check valve sees higher pressure than the air that has proceeded through the reducing valve 211 and which communicates with the other port 222 of the double-check valve. Accordingly, the double-check valve will deliver the higher pressure from the inversion valve to the relay valve and bring the air bags up to pressure.

When a vehicle operator actuates the rear axle air dump switch, a signal is provided on line 200. In addition, once the TABS controller 132 detects a velocity of less than ten (10) miles per hour, for example, a signal is then provided on line 204 to the solenoid valve 140. This signal causes the solenoid to energize and, in response, delivers air from port 144 to the control port 152 of the inversion valve, thereby causing the inversion valve to exhaust to atmosphere. As a result, pressurized air does not reach port 224 of the double-check valve. Consequently, the double-check valve still receives a reduced level of air pressure from reducing valve 211 (on the order of 10 psi) which proceeds through the double-check valve and is delivered to control port 172 of the relay valve. This causes the relay valve to exhaust the suspension to the same pressure level, i.e., on the order of 10 psi. Once the signal from the dash switch is removed so there is no signal on line 200, or once the velocity exceeds ten (10) miles per hour so that no signal is present to relay 202, the solenoid valve 144 is no longer energized due to the absence of a signal on line 204 and the system reverts to the non-dump operation described above.

Figure 4:
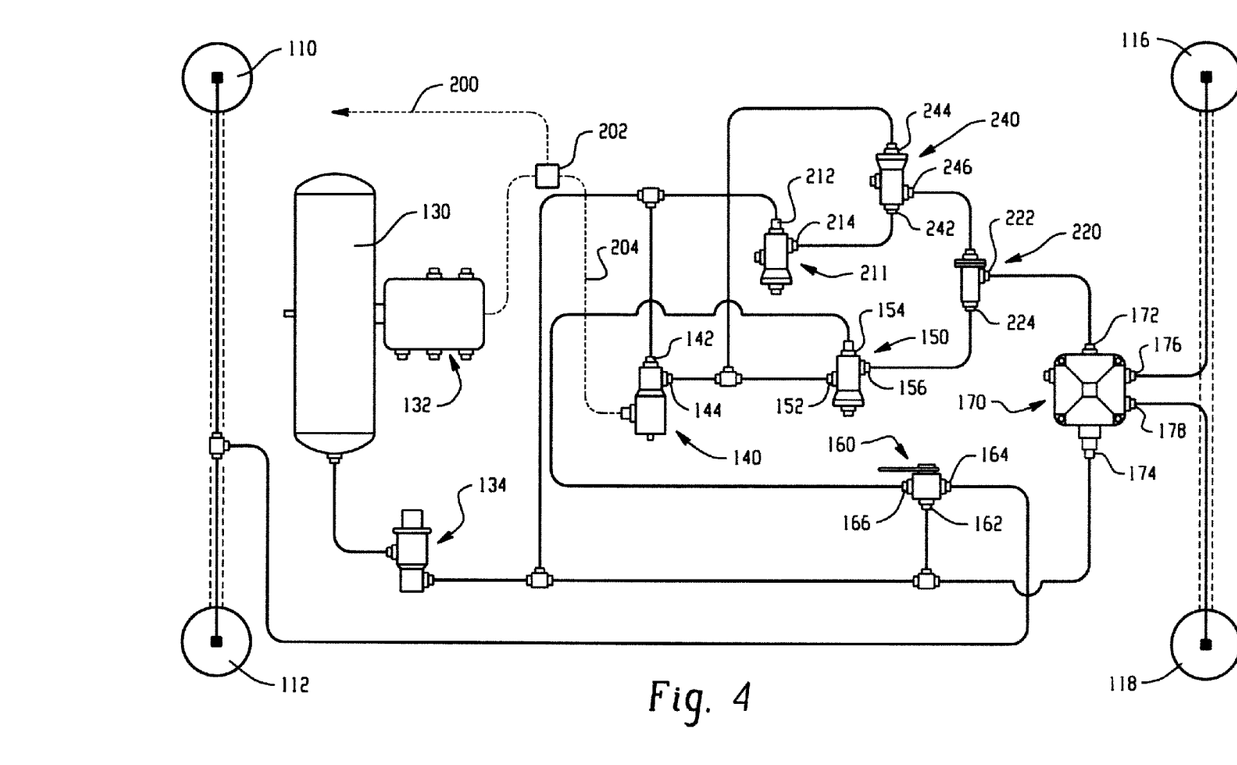
FIG. 4 is a schematic representation of a third preferred embodiment.

A double-check valve arrangement is maintained in the third embodiment of FIG. 4, however, a slightly different schematic is used to supply port 222 thereof. More specifically, a synchronization valve 240 is added to the circuit. The synchronization valve includes a supply port 242 that is delivered pressure at a reduced level from delivery port 214 of the pressure reducing valve 211. In the non-dump operation, when no control signal is present on line 204 to energize the solenoid valve 140, there is no delivery from port 144 to the inversion valve. An additional branch line communicates between the delivery port 144 of the solenoid valve and port 244 of the synchronization valve. Thus, if there is no delivery from port 144 of the solenoid valve, the synchronization valve likewise will not deliver air through port 246 to port 222 of the double-check valve. Consequently, the double-check valve will deliver the higher pressure from port 156 of the inversion valve to the control port 172 of the relay valve. This causes the relay valve to deliver air to the air bags of the suspension.

The operation of the system of FIG. 4 will now be described with reference to the dump operation. As noted previously, the vehicle operator actuates a switch to provide a signal along line 200 indicating that the vehicle operator would like to remove some air from one of the axles in order to improve maneuverability. If the TABS controller recognizes a velocity of less than ten (10) mile per hour, for example, then a signal from the auxiliary connector 202 is provided along line 204 to the solenoid valve. The solenoid is then energized and delivers air to inversion valve 150, namely port 152. This control air causes the inversion valve to exhaust to atmosphere. In addition, the solenoid valve will deliver air to the control port 244 when the solenoid is energized. This causes the synchronization valve to deliver 10 psi pressurized air, or another desired pressure level, from the reducing valve 211 to supply port 242, which then communicates with port 246 of the synchronization valve. In this manner, port 222 of the double-check valve 220 delivers the 10 psi air pressure to the relay valve control port 172. This, in turn, causes the relay valve to exhaust the air suspension associated with the rear axle to 10 psi. As will be appreciated, when the signal from the auxiliary connector 202 is removed, or the velocity goes above ten (10) miles per hour, the system then automatically reverts back to the non-dump operation described above.

Figure 5:
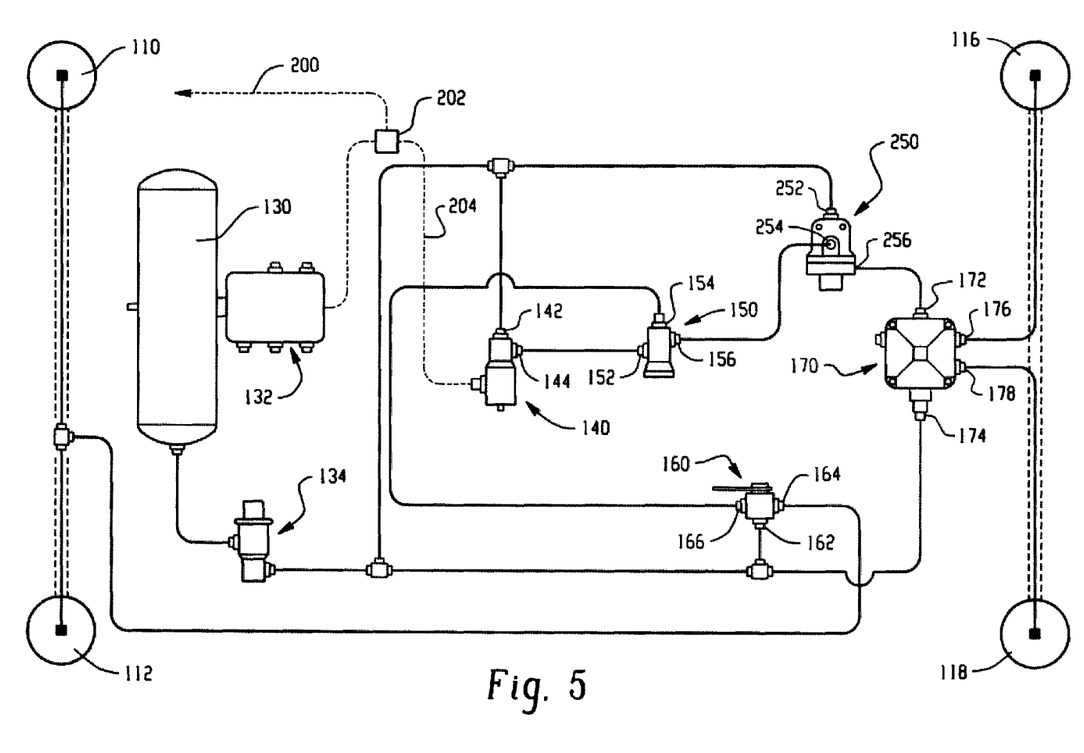
FIG. 5 is a schematic illustrating a fourth preferred arrangement.

Still another solution for selectively dumping a portion of the air from one of the axles to improve maneuverability is shown in FIG. 5. This embodiment still includes the solenoid valve and inversion valve of the pressure limiting valve assembly, and also the relay valve arrangement for quickly refilling the air bags, but additionally employs a limiting valve 250. Particularly, a supply port 252 of the limiting valve communicates with the delivery port of the pressure protection valve 134. In addition, the delivery port 156 of inversion valve 150 does not directly communicate with the relay valve 70. Instead, the inversion valve delivers air pressure to control port 254 of the limiting valve. Delivery port 256 of the limiting valve communicates with the control port of the relay valve 170.

In a non-dump operation, the leveling valve delivers air to the supply port 154 of the inversion valve. Since there is no delivery from port 144 of the solenoid valve, the inversion valve delivers air to the control port 254 of the limiting valve 250. With the limiting valve 250 being supplied with pressure from the pressure protection valve 134, and being controlled by the inversion valve 150, the limiting valve 250 will deliver full pressure to control port 172 of the relay valve. In this manner, the relay valve will deliver pressurized air from the protection valve 134 via ports 174 to ports 176, 178 that communicate with the air bags.

If the vehicle operator desires to improve maneuverability of the vehicle at low speeds, a signal is provided to line 200, for example by actuating the switch on the dash. Only when the relay 202 also receives a signal from the TABS controller acknowledging that the vehicle velocity is below a predetermined threshold, for example ten (10) miles per hour, is a signal then provided along line 204 to energize the solenoid. Energizing the solenoid of valve 140 delivers air from port 144 to the control port 152 of the inversion valve. This causes the inversion valve to exhaust air to atmosphere. Thus, no pressure signal is provided to control port 254 of the limiting valve. Without such a control signal, the limiting valve will only deliver 10 psi to the control port 172 of the relay valve. As will be appreciated, this causes the relay valve to partially exhaust the suspension air bags 116, 118 to a predetermined level, on the order of 10 psi. When the signal 200 to the relay (by de-actuating the switch) is removed or if the vehicle velocity increases above ten (10) miles per hour (as monitored by the TABS controller), then the system solution of FIG. 5 reverts to the non-dump operation.

Figure 6:
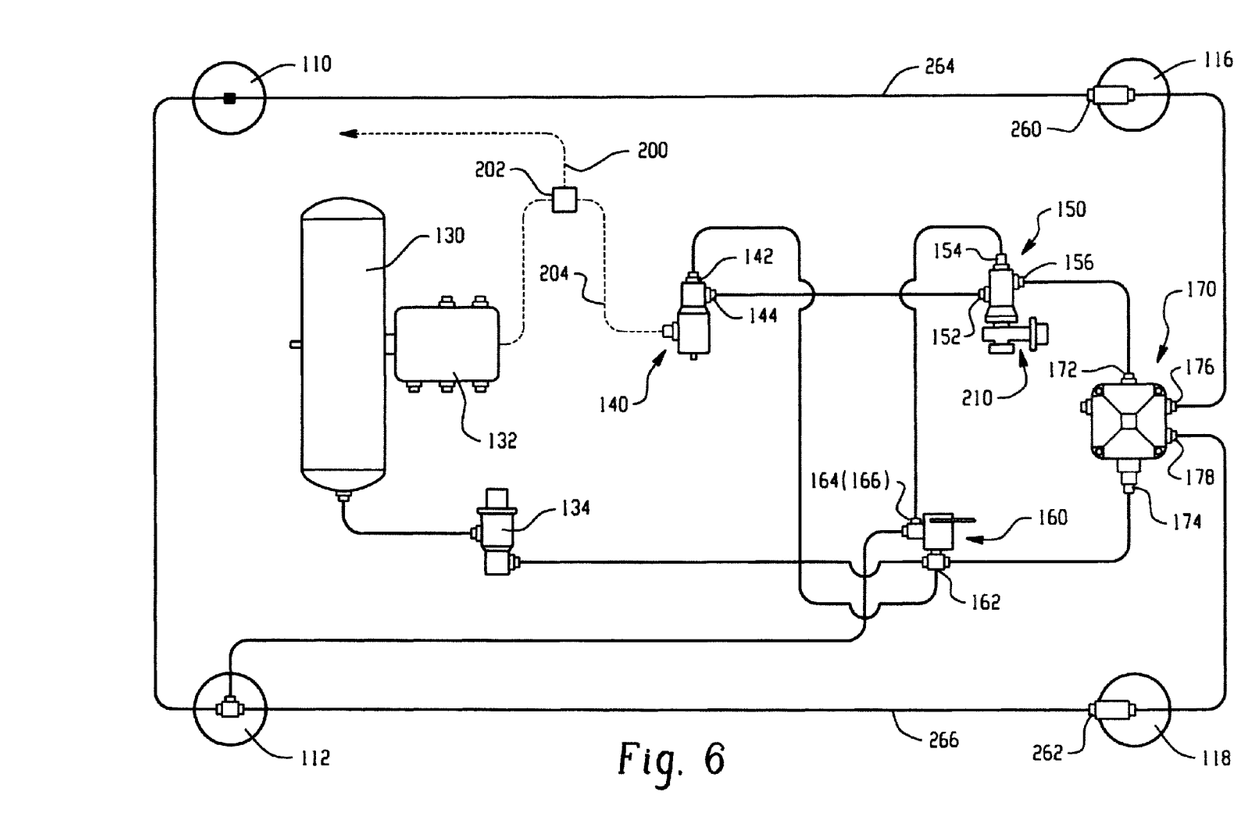
FIG. 6 shows a schematic of a suspension circuit for a fifth preferred embodiment.

The use of single check valves in a suspension circuit in conjunction with the solenoid valve, inversion valve, and relay valve, is illustrated in FIG. 6 as another potential solution. Here, single check valves 260, 262 are provided with interconnecting lines 264, 266 to provide selective one-way communication between the first/front and second/rear sets of suspension air bags. Thus, check valve 260 and line 264 interconnect the air bags on one side of the vehicle, while line 266 in conjunction with check valve 262 interconnects the air bags on the other side of the vehicle between the rear and front suspension assemblies. The check valves are arranged to permit communication from the rear suspension air bags to the front suspension air bags. The single check valves will not, however, transfer from the front suspension to the rear suspension. In this latter direction, the check valves act as a buffer against pressure spikes, for example chuck holes, bumps, etc., and preclude an air transfer from the front suspension air bags 110, 112 to the respective rear suspension air bags 116, 118 when in the dump mode.

Thus, typical non-dump operation of the schematic solution of FIG. 6 is as follows. The leveling valve 160 delivers air to the supply port 154 of the inversion valve 150. Since the solenoid is not energized in valve 140, there is no signal provided to control port 152 of the inversion valve. Consequently, the inversion valve delivers air from port 156 to the control port 172 of the relay valve 170. This, in turn, delivers air through ports 176, 178 to the air bags 116, 118 of the rear axle of the suspension arrangement.

When the vehicle operator would like to convert to the dump operation, the switch is activated to provide a signal along line 200 to relay 202. Once the TABS controller 132 indicates that vehicle speed has been reduced to a velocity under ten (10) miles per hour, a signal is then provided on line 204 to energize the solenoid. This, in turn, provides a control signal from port 144 of the solenoid valve to the control port 152 of the inversion valve and the inversion valve then exhausts air that it would have otherwise delivered to the relay valve through the pressure protection valve 210. The pressure protection valve is designed to only partially exhaust the air to a certain predetermined level, for example 10 psi, and thereby cause the relay valve to exhaust the rear suspension 116, 118 to the same level. In this manner, the rear suspension air bags are maintained at a reduced level relative to the air bags of the front suspension, and the check valves maintain this pressure differential.

Figure 7:
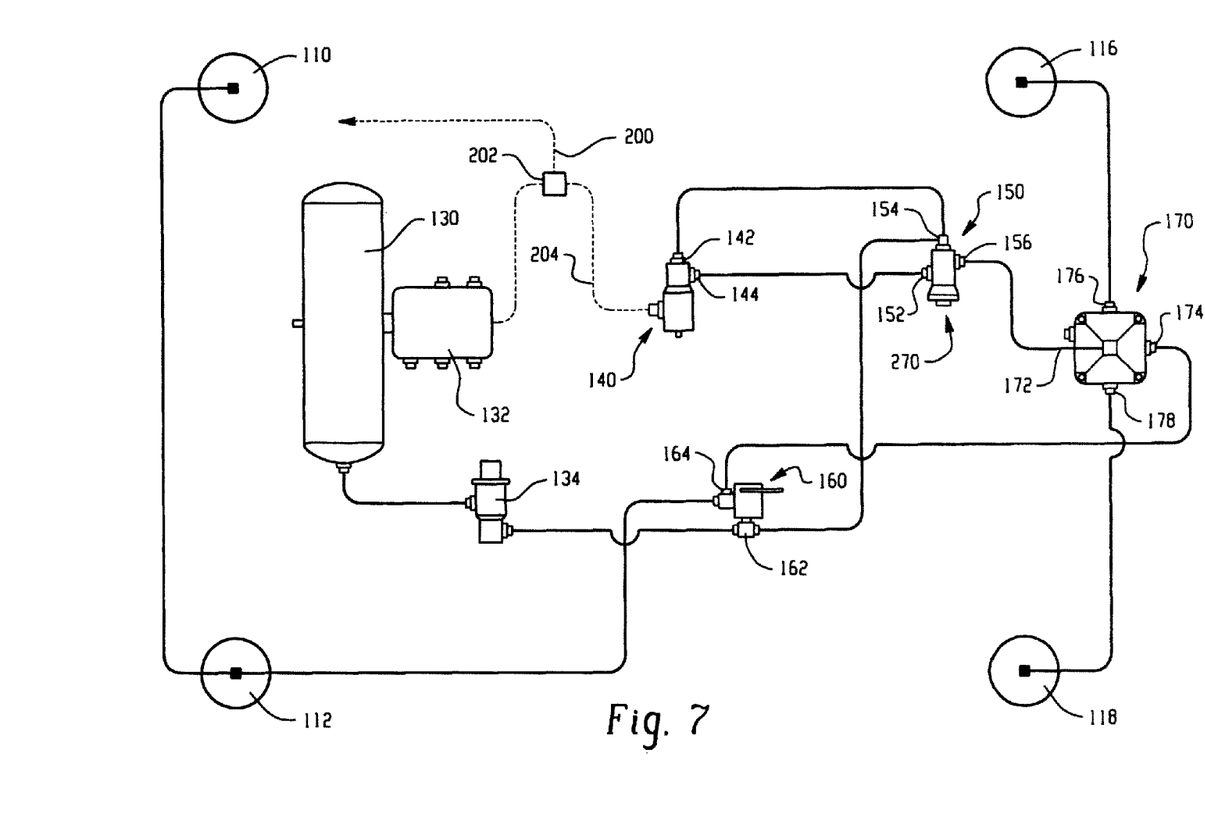
FIG. 7 schematically illustrates a sixth preferred embodiment.

An alternate solution using a commercially available R-12 relay valve available from Bendix Commercial Vehicle Systems LLC, the assignee of the present application, is shown in FIG. 7. More particularly, the leveling valve 160 delivers air directly to supply port 174 of the relay valve. In addition, the pressure protection valve 134 delivers pressurized air directly to the supply ports of the solenoid valve 140 and the inversion valve 150. The solenoid valve delivery port 144 still communicates with the control port 152 of the inversion valve. Thus, in the non-dump operation when the solenoid is not energized, the inversion valve delivers air from its supply port 154 to its delivery port 156 and thereby provides a control pressure signal to control port 172 of the relay valve. This causes the relay valve to deliver air from its supply port 174 to the dual delivery ports 176, 178 associated with air bags 116, 118, respectively, of the rear suspension.

Presuming that the vehicle operator actuates a switch for improved maneuverability at low speeds, a signal is then present at line 200. As discussed previously, it is also necessary for the TABS controller 132 to indicate to the relay 202 that the vehicle speed has dropped below a certain level, namely less than ten (10) miles per hour. Only then is a signal provided in line 204 to energize the solenoid and thereby deliver air from port 156 to the control port 152 of the inversion valve. This causes the inversion valve to exhaust its delivery through the single check valve 270 (not a pressure protection valve as in FIG. 2 or a pressure reducing valve as in Figures and 4). Importantly, though, is the fact that the check valve will limit the exhaust when it reaches a predetermined level, for example approximately 10 psi, which causes the relay valve 170 to partially exhaust the suspension to the same level, again on the order of 10 psi. When the signal from the auxiliary connector is removed in line 200, or if the TABS controller indicates that vehicle velocity has risen above ten (10) miles per hour, there is no signal at 204 thus de-energizing the solenoid and the system reverts to non-dump operation.

Figure 8:
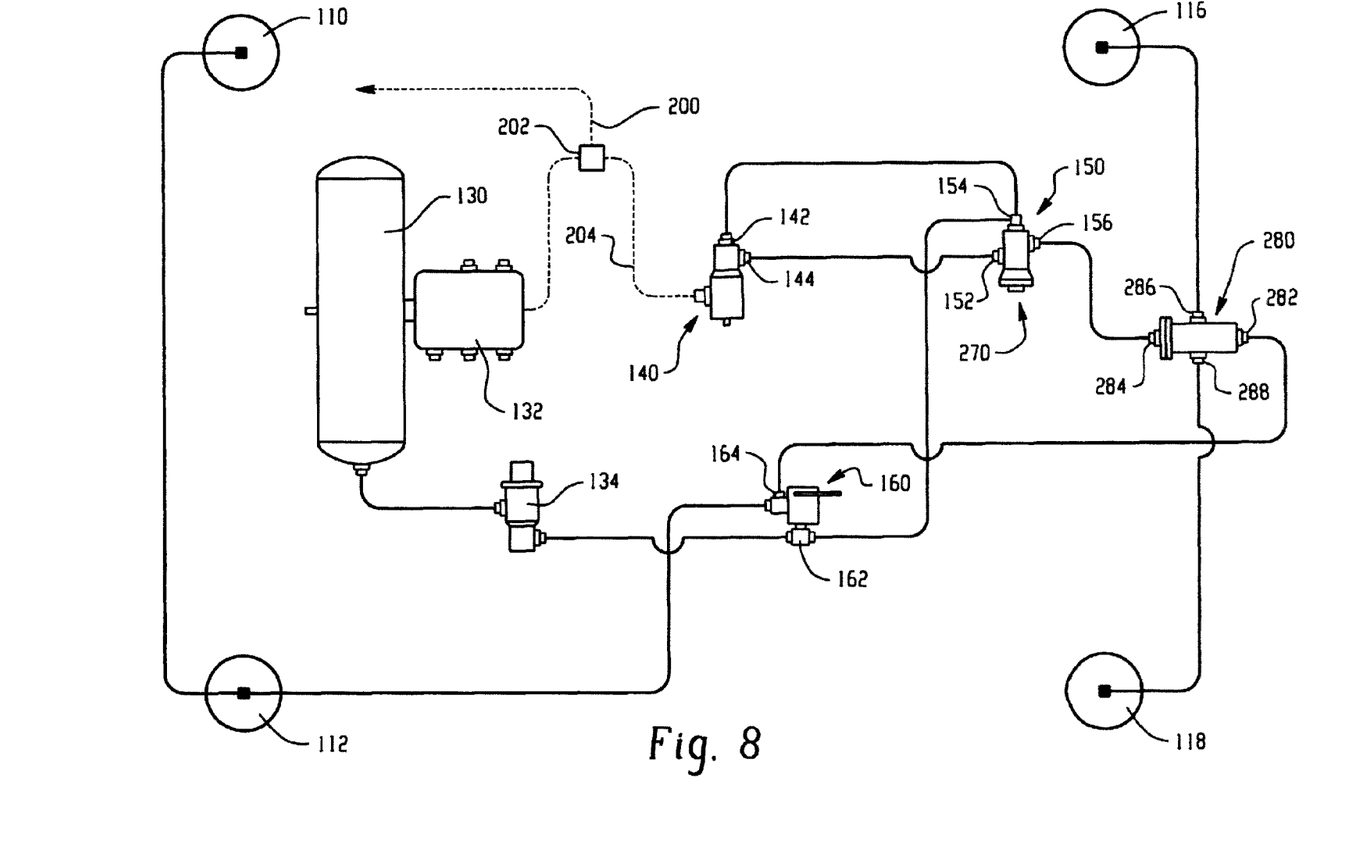
FIG. 8 is yet another schematic of a seventh preferred embodiment.

FIG. 8 illustrates a modified SR valve in an arrangement that bears some similarities to that described with respect to FIG. 7. Here, however, there is no pressure protection or check valve associated with the inversion valve as was the case with the valve 270 in the FIG. 7 solution. Instead, leveling valve 160 receives supply pressure at port 162 from the pressure protection valve 134. It delivers air pressure from the leveling valve to the front suspension air bags 110, 112 and to a modified SR valve 280, having a supply port 282. In addition, the pressure protection valve 134 is plumbed directly to the supply ports 142 of the solenoid valve and 154 of the inversion valve. In the non-dump operation, i.e., when there is no signal in line 204 to energize the solenoid, there is consequently no delivery from port 144 to the control port 152 of the inversion valve. Consequently, the inversion valve 150 delivers air from delivery port 156 to control port 284 of the modified SR valve so that air at supply port 282 is delivered from ports 286, 288 to respective air bags 116, 118 of the rear air suspension.

In the dump operation, the solenoid in solenoid valve 140 is energized and provides the air pressure signal to control port 152 of the inversion valve. This, of course, means that the vehicle operator has actuated the system switch, and that the vehicle is also operating at a velocity of less than ten (10) miles per hour. The control signal of port 152 causes the inversion valve to exhaust its delivery to atmosphere. This, in turn, means that there is no pressure signal at control port 284 and the modified SR valve then partially exhausts its delivery until an internal mechanism stops the exhaust at the predetermined threshold, for example on the order of 10 psi. Likewise, when the vehicle operator returns the switch to the non-dump position, or if the velocity goes above ten (10) miles per hour, the solenoid is de-energized and thus the system reverts to the non-dump operation described above.

In summary, this disclosure provides semi-trailers equipped with axle suspensions to partially exhaust air from the air suspension or air bags to reduce tire wear when maneuvering at slow speeds. The disclosure prevents the driver of the vehicle from exhausting air from the suspension of an axle when the vehicle is operating at a speed above ten (10) miles per hour. This is accomplished by modifying the software capabilities of a conventional TABS brake controller.

The disclosure also provides a method for reducing air bag pressure while importantly preventing exhausting of all of the air to the atmosphere, i.e., only partially exhausting the air. By not reducing the air suspension pressure to atmosphere, the fill time associated with refilling is reduced.

Moreover, by using the relay valve, higher flow rates are enabled to the air bags, which also shortens the time to restore the pressure to the suspension. Stated another way, the relay valve improves system responsiveness since flow rate is not limited by the constraints of the leveling valve.

The attendant risk of damaging air bags is also eliminated by preventing exhausting of the air to atmosphere. Moreover, these arrangements also assure that more pressure is provided to the front suspension assembly than the rear axle during the dump operation.

The invention has been described with reference to the preferred embodiment. Modifications and alterations will occur to others upon reading and understanding this specification. It is intended to include all such modifications and alterations in so far as they come within the scope of the appended claims or the equivalents thereof.

Having thus described the invention, it is now claimed:

1. A process for controlling vehicle loading on a multi-axle vehicle having front and rear axles comprising:
   reducing pressure in a first axle suspension system when maneuvering the vehicle at predetermined slow speeds;
   keeping pressure in the first axle pneumatic suspension system at the predetermined slow speed; and
   keeping a different pressure in a second axle pneumatic suspension system at the predetermined slow speed;
   wherein the pressure reducing step includes using a pressure limiting valve assembly that employs a solenoid valve, and an inversion valve coupled to a relay valve, and wherein the pressure limiting valve assembly prevents substantially complete exhaustion of pressure from the first axle pneumatic suspension system.

2. The process of claim 1 wherein the different pressure in the second pneumatic suspension system is greater than the pressure in the first axle pneumatic suspension system.

3. The process of claim 1 wherein the pressure in the first axle pneumatic suspension system is maintained at a first predetermined pressure.

4. The process of claim 1 wherein the different pressure in the second pneumatic suspension system is maintained at a second predetermined pressure.

5. The process of claim 1 wherein the pressure in the first pneumatic suspension system is on the order of ten psi.

6. The process of claim 1, wherein the pressure reducing step includes using a pressure limiting valve assembly that employs a pressure protection valve coupled to the inversion valve, to prevent substantially complete exhaustion of pressure from the first axle pneumatic suspension system.

7. The process of claim 1 wherein the pressure reducing step is dependent on vehicle speed being ten mph or less.

8. The process of claim 7 wherein the pressure reducing step is dependent on required dump mode signal.

9. The process of claim 1 further comprising restoring air pressure upon vehicle speed exceeding a predetermined value.

10. The process of claim 9 wherein the air pressure restoring step uses a relay valve to enable higher flow rates to the pneumatic suspension system.

11. The process of claim 1 further comprising using an anti-lock brake system controller for indicating the vehicle speed.

12. A process for improving maneuverability of an associated multi-axle vehicle having an air suspension assembly including first and second air bags, comprising:
   receiving pressurized air at a leveling valve from a reservoir of pressurized air;
   selectively delivering air, via an air delivering valve, to the first and second air bags;
   using a pressure limiting valve assembly to prevent the first air bags from becoming completely exhausted;
   monitoring a speed of the vehicle;
   selectively providing a control signal indicative of whether the vehicle speed is below a predetermined threshold;
   receiving the control signal at a solenoid valve;
   partially exhausting air from the first air bags to improve vehicle maneuverability at speeds below the predetermined threshold;
   reducing air received from the reservoir via a pressure reducing valve;
   delivering control pressure from the solenoid valve via a double check valve that communicates with the pressure reducing valve and with an inversion valve; and
   controlling pressure via a relay valve that is coupled to the double check valve, which delivers the control pressure to the relay valve.

13. The process of claim 12, wherein monitoring the speed of the vehicle and selectively providing the control signal are performed using an ABS controller that also controls ABS functions of the vehicle.

14. The process of claim 12, wherein the air delivering valve is responsive to the inversion valve.

15. The process of claim 12, wherein the air delivering valve is responsive to the solenoid valve.

16. The process of claim 12, further comprising providing pressurized air directly from the reservoir directly to the air delivering valve.

17. The process of claim 12, further comprising providing pressurized air from the reservoir directly to the pressure limiting valve assembly.

18. The process of claim 12, further comprising providing pressurized air from the reservoir directly to the second air bags.

19. The process of claim 12, further comprising permitting air flow from the first air bag to the second air bag, and precluding air flow from the second air bag into the first air bag, via a check valve that is interconnected between the first and second air bags.

* * * * *